May 30, 1933.   R. C. BOUGHTON   1,911,601
MACHINE FOR SPIRALLY ADVANCING CYLINDRICAL BODIES
Filed Jan. 14, 1930   3 Sheets-Sheet 1
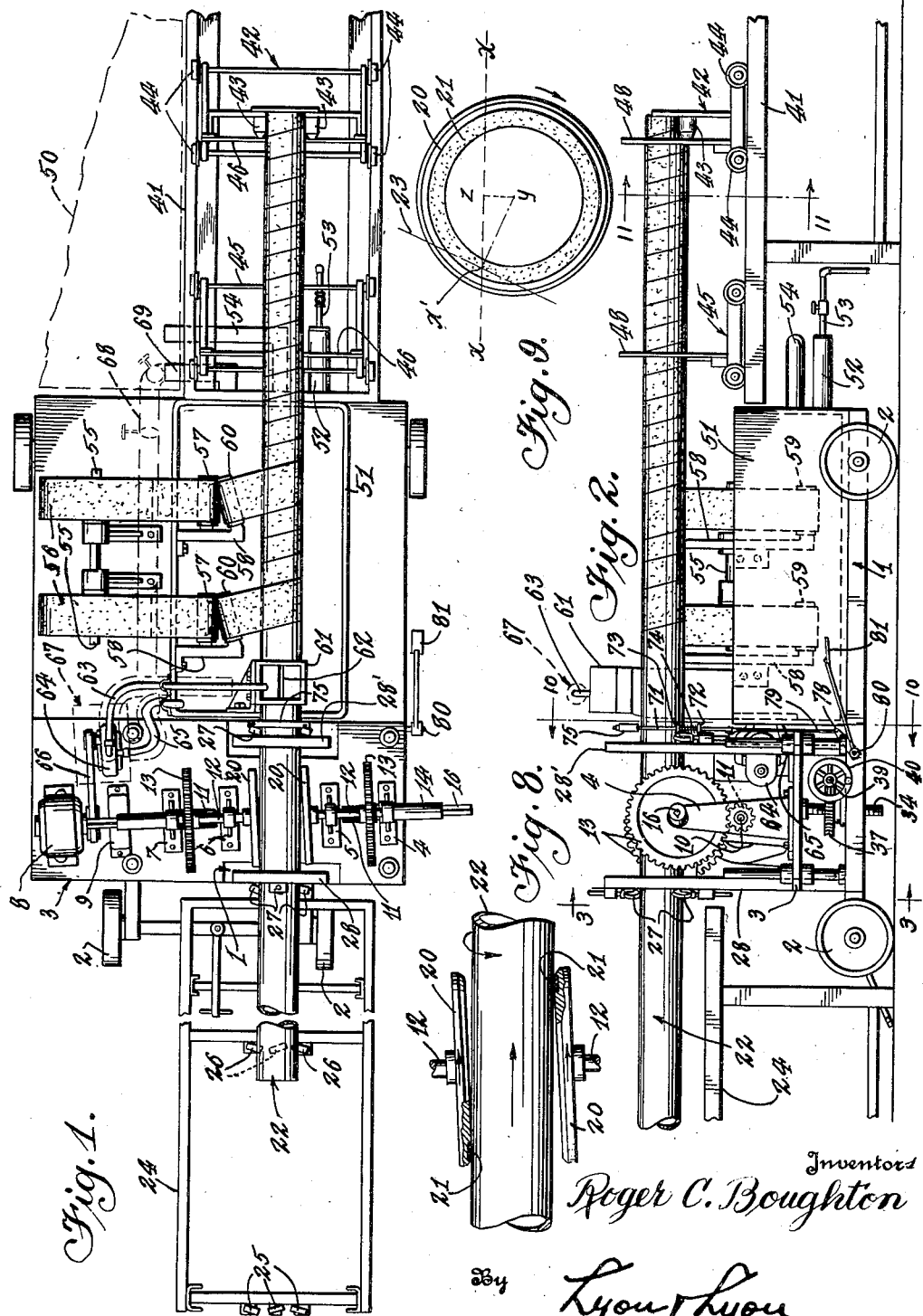
Inventor
Roger C. Boughton
By Lyon & Lyon
Attorneys

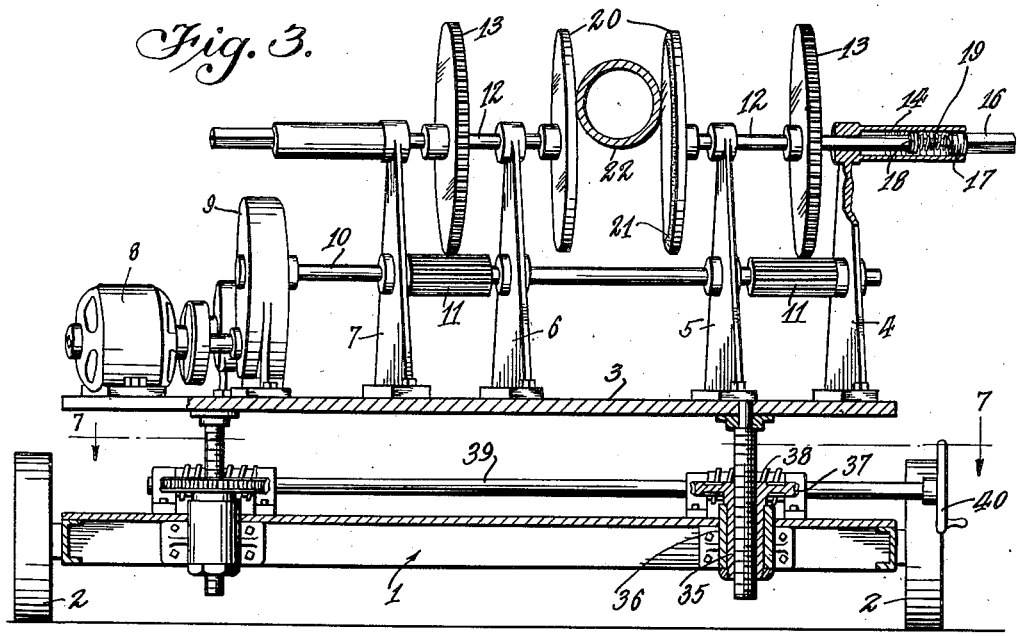
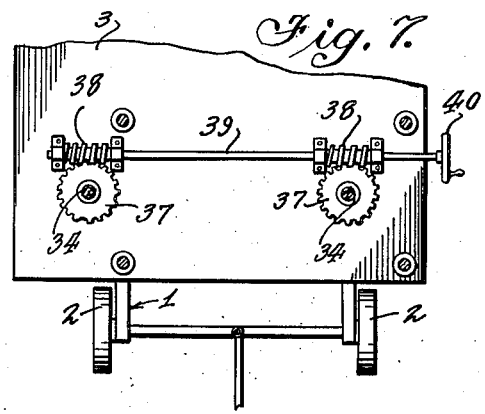
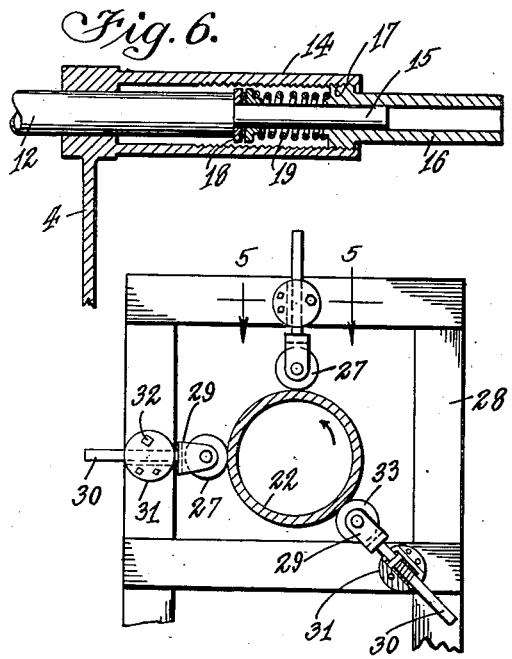

May 30, 1933.   R. C. BOUGHTON   1,911,601
MACHINE FOR SPIRALLY ADVANCING CYLINDRICAL BODIES
Filed Jan. 14, 1930    3 Sheets-Sheet 3
Fig. 11.
Fig. 10.
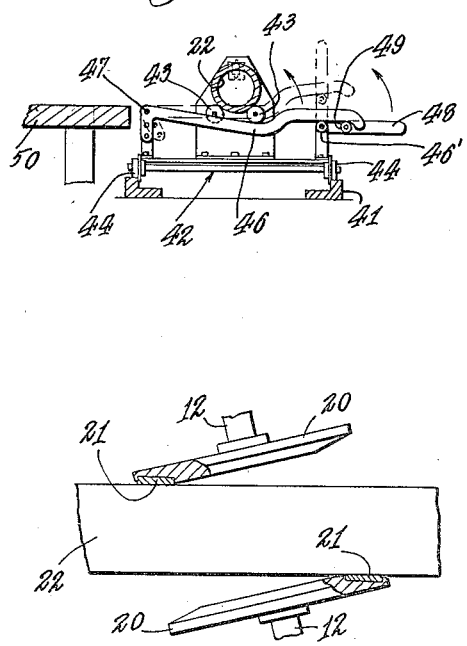
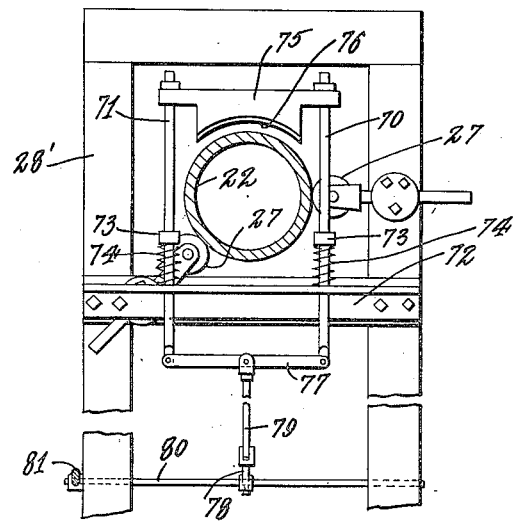
Fig. 12.
Fig. 13.
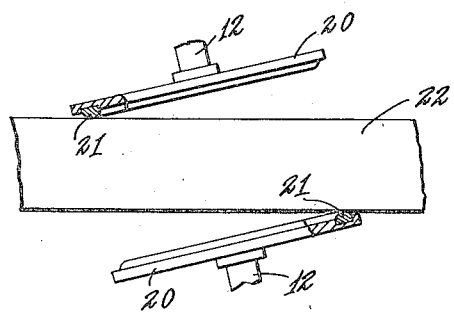
Inventor
Roger C. Boughton
By Lyon & Lyon
Attorneys Patented May 30, 1933

1,911,601

UNITED STATES PATENT OFFICE

ROGER C. BOUGHTON, OF LOS ANGELES, CALIFORNIA, ASSIGNOR TO McEVERLAST, INC., OF LOS ANGELES, CALIFORNIA, A CORPORATION OF NEVADA

MACHINE FOR SPIRALLY ADVANCING CYLINDRICAL BODIES

Application filed January 14, 1930. Serial No. 420,807.

This invention relates to an apparatus for spirally advancing cylindrical bodies, such as for example, cylinders, tubes, pipes, posts, poles, piles and the like.

The invention also relates to a machine for simultaneously rotating and longitudinally advancing cylindrical bodies, said machine employing a new and novel construction whereby cylindrical bodies may be thus advanced readily and effectively.

One specific form of the invention disclosed hereinafter relates to an apparatus for coating and wrapping cylindrical bodies, such as pipe.

Numerous devices have been disclosed in the prior art adapted to spirally advance cylindrical bodies. These prior devices, however, are either of complex structure or are inefficient and uncertain in operation.

Furthermore, the prior devices can not be readily adjusted and the longitudinal speed can not be readily varied, also the prior devices are incapable of being readily adjusted for cylindrical bodies of varying diameters.

An object of this invention is to disclose and provide a mechanism for spirally advancing cylindrical bodies in a more facile and economical manner than has been possible heretofore.

Another object is to disclose and provide a machine for spirally advancing cylindrical bodies without marring or scarring such bodies.

Another object is to disclose and provide a machine for simultaneously rotating and longitudinally advancing cylindrical bodies, in which the longitudinal speed of the cylindrical bodies may be readily varied.

Another object of this invention is to disclose and provide a mechanism for helically advancing cylindrical bodies at a uniform speed, means being provided for permitting couplings, joints or other appurtenances causing minor enlargements in the diameter of the cylindrical body to pass through the device.

A still further object is to disclose and provide a machine for simultaneously rotating and advancing cylindrical bodies of different diameters and at different speeds.

Another object is to disclose and provide a new and novel machine for wrapping cylindrical bodies.

These and other objects will become apparent to those skilled in the art from the description of one form which the machine embraced by this invention may take.

For purposes of illustration, reference will be made to the appended drawings, in which:

Fig. 1 is a plan view of the driving mechanism embraced by this invention, as adapted for use in a pipe wrapping machine.

Fig. 2 is a side elevation of the major portion of the machine illustrated in Fig. 1.

Fig. 3 is an enlarged transverse section taken generally along the plane indicated at 3—3 in Fig. 2.

Fig. 4 is a transverse section taken through a portion of the machine illustrated in Figs. 1 and 2, showing means of supporting the cylindrical body.

Fig. 5 is a section taken along the plane 5—5 indicated in Fig. 4.

Fig. 6 is an enlarged section through the driving shaft of the device.

Fig. 7 is a reduced plan view, taken generally along the plane 7—7 indicated in Fig. 3.

Fig. 8 is an enlarged plan view showing the method of driving the cylindrical body, portions of the driving discs being broken away.

Fig. 9 is a face view of one form of driving disc which may be employed.

Fig. 10 is an enlarged transverse section of the device, taken generally along the plane 10—10 indicated in Fig. 2.

Fig. 11 is a transverse section, taken generally along the plane indicated at 11—11 in Fig. 2.

Fig. 12 is an enlarged plan view showing a modified form of driving disc, a portion of the driving disc being broken away.

Fig. 13 is a still further modification of driving discs which may be employed in carrying out this invention.

As shown in the drawings, the machine may comprise a base 1 which may be either stationary or portable. If a portable base is desired, it may be mounted on suitable wheels 2. The base may carry a frame 3 provided with uprights or pedestals 4, 5, 6 and 7, or their equivalent. The base 3 may also carry a motor 8 connected by suitable gearing, such as a gear box 9, to a driving shaft 10 journaled in said pedestals 4, 5, 6 and 7.

Between each pair of pedestals a long pinion 11 may be mounted on the shaft 10. Above said driving shaft 10 shorter shafts 12 may be journaled in the pedestals 4 and 5 and 6 and 7, respectively. The shafts 12 may be driven by means of a gear 13 mounted on the shaft 12 and in operable engagement with the driving pinions 11. Each of the shafts 12 may be longitudinally movable.

Means for imparting longitudinal motion to the shafts 12 may take the form illustrated in Fig. 6, and comprise a tubular internally threaded extension 14 carried by or made a part of the outer pedestals 4 and 7, said tubular extensions being adapted to loosely receive the ends of shafts 12. The end of shaft 12 may be of reduced diameter, as indicated at 15, and be slidably received in an adjusting gland 16 provided with threads cut in its outer surface and adapted to operatively engage the internally threaded surfaces of the extensions 14, as indicated at 17. The outer portion of the gland member 16 may be squared, as indicated in Fig. 3, thereby facilitating the rotation of the gland member 16.

A bearing 18 may be held against the shoulder formed in the shaft 12, and a compression spring 19 may be carried between said bearing and the end of the gland member 16. The shafts 12 will thus be forced toward each other by the springs 19, and by adjusting the gland member 16 within the extension 14 the pressure with which are forced together may be regulated.

Driving discs 20 may be mounted on the ends of shafts 12, each of said driving discs being provided preferably with a beveled outer edge so as to impart a slightly convex surface to such discs, as is indicated in Fig. 8.

Preferably, each of the driving discs 20 is provided with a driving ring or a driving facing such as a ring of asbestos composition, leather or other suitable material 21, partially embedded in the face of the disc 20. It will thus be seen that as the shaft 10 is driven, the two shafts 12 will rotate in the same direction. If the shafts 12 are inclined to the longitudinal axis of a cylindrical body, such as for example, a pipe 22 (Fig. 8), so that only a portion of the driving ring 21 carried by each of said discs 20 contacts with the outer surface of the cylindrical body 22, the cylindrical body 22 will be rotated. If the longitudinal axes of the shafts 12 (when extended) pass the longitudinal axis of the cylindrical body at a certain predetermined or minimum distance therefrom, then the cylindrcal body 22 will be spirally advanced between the driving discs.

As diagrammatically shown in Fig. 9, if the longitudinal axis of the cylindrical body 22 is indicated by the line X—X, then the longitudinal axis of the driving shaft 12, indicated by the center Y, will pass the longitudinal axis of X—X at a distance represented by the line Y—Z. The cylindrical body will contact with the driving ring 21 at a point X', and the tangent to the circle at the point, said tangent being represented by the line 23, represents the effective force imparted to the cylindrical body 22 by the driving disc 20, and particularly by the driving ring 21 carried thereby.

By varying the distance Y—Z, the linear speed of the cylindrical body 22 may be varied, the linear speed becoming maximum when the distance Y—Z is equivalent to the radius of the driving disc and becoming negligible as such distance approaches zero. Intermediate points will impart a simultaneous longitudinal motion and a rotation to the cylindrical body 22.

As shown in Fig. 8, two driving discs 20 are employed, both of said discs rotating in the same direction, and both being inclined to the outer surface of the cylindrical body 22. It is not necessary to employ two discs, however, as one disc will impart a simultaneous longitudinal motion and rotation to a cylindrical body. Furthermore, any desired number of driving discs may be employed in various positions around the cylindrical body, and their direction of rotation need not be the same. In all instances, however, the distance between the longitudinal axis of the shaft upon which the disc is mounted and the longitudinal axis of the cylindrical body being driven should be the same, so that the resultant forces are substantially equal. Those skilled in the art will appreciate the number of modifications which the driving unit described hereinabove may take.

Figs. 12 and 13 disclose two of such modifications. As shown in Fig. 12, the driving ring 21 is slightly inclined to the face of the driving disc 20. The angle that the face of the driving disc 21 makes with the face of the disc 20 may be complementary to the angle made by the longitudinal axis of the driving shaft 12 and the longitudinal axis of the pipe or other cylindrical body 22. In this manner, the driving face 21 will contact with the outer surface of the body 22 along a line parallel to the longitudinal axis of the pipe 22.

As shown in Fig. 13, the driving ring 21 may take the form of an annular protuberance of semispherical section, thereby permitting driving by means of a frictional point of contact with the outer surface of the cylindrical body 22.

The cylindrical body 22 which it is desired to spirally advance may be supported upon a line of support, preferably comprising one or more suitable rollers. As shown in Fig.

1, a table 24 may be provided, said table carrying a plurality of rollers 25 and 26. These rollers are preferably angularly positioned with respect to the longitudinal axis of the cylindrical body 22, and their angularity varying with the longitudinal speed or with the number of revolutions per linear foot of the cylindrical body.

Similar rollers, such as the rollers 27, may be positioned in a suitable stationary framework 28 which may be mounted on the base 3 but which is preferably supported on bed 1. The rollers 27 as well as the rollers 26 and 25 may be radially adjustable toward a common center, and may be journaled in yokes 29, said yokes being carried by rods 30 adjustably positioned in a split clamp 31 provided with a tightening bolt 32. By loosening the tightening bolt 32, the distance of the roller 27 from the common center (which is preferably coincidental to the longitudinal axis of the cylindrical body 22) may be varied. Furthermore, the angular position of the roller 27 with respect to the longitudinal axis may also be varied by partially rotating the rod 30 in the clamp member 31.

A roller 33 also mounted upon a yoke 29 connected to a rod 30 may also be carried by the frame 28, said roller 33 being preferably yieldably urged toward the cylindrical body which it is desired to support on the line of support. The yieldable roller 33 may be positioned either vertically above the cylindrical body, or preferably be positioned in such manner as to permit a movement of the cylindrical body when its diameter increases in an angular direction, that is, at an angle to both the horizontal and vertical. As shown in Fig. 4, it will be seen that any increase in the diameter of the cylindrical body 22 will cause the longitudinal axis of said body to shift downwardly and to the right at an angle of about 45 degrees.

The rollers 25, 26, 33 and the like constitute a line of support upon which the cylindrical bodies 22 may be supported and fed to the driving mechanism. It will be readily understood that the horizontal plane in which the driving shafts 12 lie may be fixed, and the position of the longitudinal axis of the cylindrical body may be varied with respect to the position of the longitudinal axis of the driving shafts 12 by suitably adjusting the position of the rollers 25, 26, 33 and the like.

In other words, the line of support may be moved, whereas the driving discs may be immovable vertically. By so adjustably positioning the driving shafts 12 relatively to the line of support and to the longitudinal axis of the cylindrical body, the rate at which the cylindrical body is spirally advanced may be varied.

As shown in the drawings, the vertical position of the drive shafts 12 may be varied by raising or lowering of the frame 3. The means for raising and lowering the frame 3 may comprise threaded shafts 34 firmly connected to the base 3 and in threaded engagement with internally threaded sleeves 35.

Said sleeves may be rotatably held in suitable bosses 36 carried by the base 1 of the device. The sleeves 35 may be provided with worm gears 37 in operative engagement with worms 38 mounted on a shaft 39 which may be driven in any suitable manner, as for example, by means of a hand wheel 40. Rotation of the shaft 39 will, therefore, be translated into rotation of the sleeves 35 and thus cause the threaded rods 34 to move within the sleeves 35, thereby raising and lowering the frame 3. In this manner the vertical relationship between the line of support or the longitudinal axis of the cylindrical bodies 22 and the vertical position of the longitudinal axis passing through the drive shafts 12 may be varied.

A table 41 may be positioned in alinement with the table 24, said table 41 being provided with a longitudinally movable carriage or carriages adapted to support the cylindrical body spirally advanced by the driving mechanism. One of the carriages mounted on the table 41 may be adapted to support the end of the cylindrical body, such a carriage indicated generally at 42 being provided with two or more rollers 43 preferably mounted on axes paralleling the longitudinal axis of the cylindrical body. The carriage 42 may be mounted upon wheels 44 cooperating with a suitable track formed or attached to the table 41. A suitable carriage, such as the carriage 45, may also be mounted on the table 41.

The carriage 45 may be provided with a lever 46 pivoted at 47, and provided with a depression adapted to receive the cylindrical body 22, the end of the lever 46 being supported upon a pin 46'. A lever 48 may be pivotally connected to the pin 46', the lever 48 being provided with a roller or pin 49 spaced from the pivotal connection at 46'. By raising the lever 48 the lever 46 will be caused to rise, thereby assisting in lifting the cylindrical body 22 from the rollers 43 and in discharging the cylindrical body 2 onto a suitable runway 50 adapted to carry away the now wrapped or coated bodies. A similar discharge mechanism may also be carried by the carriage 42.

The base 1 may be provided with a tank 51 positioned below the line of support of the adjoining tables 24 and 41. The tank 51 is preferably filled with a suitable coating or impregnating bituminous material. The contents of the tank 51 may be heated in any suitable manner, as for example, by means of a plurality of pipes or conduits 52 extending into the tank 51. A burner 53 may be fitted into the end of the conduit, the opposing end of the conduit discharging the gases as indicated by the end 54. It will be understood that the contents of the tank 51 may be heated by means of steam coils, or by means of an open fire beneath the tank, if this is desired.

The base 1 may also support spindles 55 adapted to hold rolls of wrapping material, such as impregnated cloth, paper, ordinary muslin or other fibrous material, thin sheet metal and the like, two of such rolls 56 being shown in the drawings. The strip of wrapping material from the feed rolls 56 may pass over suitable rollers 57 journaled on spindles attached to brackets 58 extending from the sides of the tank 51, thereby directing the wrapping material from the feed rolls onto the cylindrical body 22 being wrapped.

If desired, the wrapping material may pass over the rollers 56 downwardly into the tank 51, passing over rollers 59 rotatably positioned in the asphaltic material in the bottom of the tank. The wrapping material may then pass upwardly out of the tank and over roller 60, from whence it may pass onto the cylindrical body 22. The roller 60 may be inclined to the longitudinal axis of the cylindrical body 22 so as to impart the desired helical position to the wrapping material with respect to the pipe or other body being covered.

Before wrapping the pipe it may be desirable to coat the pipe with the asphaltic or bituminous material. A hopper 61 may be provided with a narrow longitudinal opening in its bottom, such as the opening indicated at 62.

Liquid asphaltic or bituminous material may be supplied to the hopper 61 by means of a line 63 connected to the discharge port of a pump 64 to which the asphaltic material is conducted by means of a line 65 from the tank 51. The pump 64 may be driven in any suitable manner from the motor 8, as for example, by means of a belt 66.

The lines 63 and 65 may be covered with a heat insulating material or both the lines 63 and 65 as well as the pump 64 may be enclosed in a housing, generally indicated at 67, said housing being supplied with the waste heat gases from one of the convolutions of the heating pipes 52. As shown in the drawings, the housing 67 is connected to a conduit 68 leading to a conduit 69, which is in turn a portion of the heating system connected to the conduit 52 in which the burner 53 is situated.

In order to facilitate the operation of the mechanism, and particularly in order to hold the cylindrical body, such as pipe, in position when adjoining lengths are connected thereto or placed in abutting relation therewith, one of the frames 28, such as for example the frame 28′, may be provided with a brake mechanism comprising a movable frame consisting of vertical rods 70 and 71 passing through apertures in an angle iron 72 attached to the frame 28′.

The rods 70 and 71 may be provided with collars 73, and compression springs 74 may surround the rods 70 and 71 between the angle iron 72 and the collar 73. The upper ends of the rods 70 and 71 may be connected by means of a member 75 provided with a sharp or serrated lower edge 76 adapted to grip the pipe when the rods 70 and 71 are depressed. The lower ends of the rods may be connected by means of a member 77 which in turn is connected to a bell crank lever 78 by means of a rod or pitman 79. The bell crank lever 78 may be mounted on a shaft 80 and operated by means of a foot pedal 81. By depressing the foot pedal 81 the brake member 75 will contact with the upper surface of the cylindrical body 22, and thereby prevent its helical or longitudinal advance.

If desired, the wrapping material may pass over the rollers 56 downwardly into the tank 51, passing over rollers 59 rotatably positioned in the asphaltic material in said tank. The wrapping material may then pass upwardly out of the tank and over a roller 60 from whence it may pass onto the cylindrical body 22. The rollers 60 may be inclined to the longitudinal axis of the cylindrical body 22, so as to impart the desired helical position to the wrapping material with respect to the pipe or other body being covered.

The operation of the driving mechanism will be readily understood from the description given hereinabove. Cylindrical bodies may be positioned upon a line of support and passed into contact with driving discs 20.

The driving discs 20 may be yieldably pressed against a cylindrical body, as by means of the spring thrust bearings shown in Fig. 6 and described hereinabove. The rotation of the driving discs 20 imparts a simultaneous longitudinal and rotary motion to the pipe.

If a pipe is to be wrapped and it is desired to first coat it with a bituminous material, then the heated bituminous material from tank 51 may be discharged by pump 64 into the hopper 61, from whence a desired stream of material may be caused to flow over the pipe as it is spirally advanced through the driving mechanism. Suitable wrappings may then be placed upon the primed pipe, any desired number of wrappings being employed. If two or more wrappings are used, it is desirable that succeeding strips of wrapping material overlap the joints formed in the preceding wrappings.

The forward end of the pipe or other cylindrical body being thus advanced may be supported upon the rollers 43 of the carriage 42, the driving discs 20 advancing not only the pipe but also the carriage 42 on which the forward end is supported. When the entire section of pipe has passed through the driving mechanism and has been moved longitudinally along the table 41 until it is clear of the portion occupied by the driving mechanism, it may be discharged from the carriages 42 and 45 by operation of the levers 48.

Attention is particularly called to the fact that the helical advance of the cylindrical body is not accomplished by means of rollers engaging the body with their edges, but instead by means of discs which frictionally engage the outer surface of the cylindrical body with a portion of their faces.

Although the driving ring carried by the disc 20, as shown in Fig. 8, lies substantially in the face of the disc, it is to be understood that annular driving rings making an acute angle to the plane of the disc may be carried by said disc. Such driving rings when in contact with a cylindrical body will lie along the line of contact in a plane substantially parallel to the outer surface of the cylindrical body.

In view of the fact that the driving rings are yieldably pressed against the cylindrical bodies which are helically advanced, it is possible to pass cylindrical bodies or slightly conical bodies through the mechanism. Furthermore, any inequalities in the surface of the cylindrical bodies being thus driven do not hinder the operation of the mechanism. For example, pipe provided with bell-ends may be driven by the mechanism described hereinabove, the driving discs moving away from the cylindrical bodies when protuberances such as bell-ends come in contact with such discs. Such protuberances, furthermore, do not increase the linear or longitudinal rate of movement, as such linear speed is entirely dependent upon the effective distance between the axis of the cylindrical body and of the driving shafts. Pipe which have been coupled together may also be passed through the device very readily; the couplings passing through the driving mechanism without influencing the speed of rotation or the linear movement, even though such couplings are of greater outer diameter than the main portions of the pipe.

Although a particular arrangement and combination of elements has been described hereinabove, it is to be understood that the complete machine disclosed hereinabove has been given merely for purposes of illustration, and numerous changes and modifications may be made therein without departing from the invention. All such changes and modifications as come within the scope of the appended claims are, therefore, embraced thereby.

I claim:

1. In a machine for spirally advancing cylindrical bodies, the combination of means upon which a cylindrical body may be supported, a disc having a face inclined to the outer surface of the cylindrical body, said disc face being provided with an annular ring adapted to frictionally engage the surface of said cylindrical body, said disc being mounted on a rotatable shaft whose axis when extended will pass the longitudinal axis at a desired distance therefrom.

2. In a machine for spirally advancing cylindrical bodies, the combination of means upon which a cylindrical body may be supported, a disc having a face inclined to the outer surface of the cylindrical body, said disc face being provided with a ring adapted to frictionally engage the surface of said cylindrical body, said disc being mounted on a rotatable shaft whose axis when extended will pass the longitudinal axis at a desired distance therefrom, and means for adjustably positioning said shaft and cylindrical body relatively to each other to vary said desired distance.

3. In a machine for spirally advancing cylindrical bodies, the combination of means upon which a cylindrical body may be supported, a disc having a face inclined to the outer surface of the cylindrical body, said disc face being provided with an annular ring adapted to frictionally engage the surface of said cylindrical body, said disc being mounted on a rotatable shaft whose axis when extended will pass the longitudinal axis at a desired distance therefrom, means for adjustably positioning said shaft and cylindrical body relatively to each other to vary said desired distance, and means for driving said shaft.

4. In a machine for spirally advancing cylindrical bodies, the combination of means upon which a cylindrical body may be supported, and a plurality of driving rings lying in planes inclined to the plane of the outer surface of said cylindrical body, a portion of the face of each ring being in yieldable frictional contact with the outer surface of said body, a plurality of rotatable shafts whose axes when extended will pass the longitudinal axis of the cylindrical body at a desired distance therefrom, and means for supporting each of said driving rings concentrically around one of said rotatable shafts.

5. In a machine for spirally advancing cylindrical bodies, the combination of means upon which a cylindrical body may be supported, and a plurality of driving disks having faces inclined to the plane of the outer surface of said cylindrical body, each of said disks being mounted on a rotatable shaft whose axis when extended will pass the longitudinal axis of the cylindrical body at a desired distance therefrom, and means for yieldably urging said driving disks into frictional engagement with the outer surface of such cylindrical body.

6. In a machine for spirally advancing cylindrical bodies, the combination of means upon which a cylindrical body may be supported, and a plurality of driving rings lying in planes inclined to the plane of the outer surface of said cylindrical body, a plurality of rotatable shafts whose axes when extended will pass the longitudinal axis of the cylindrical body at a desired distance therefrom, means for supporting each of said driving rings concentrically around one of said rotatable shafts, means for yieldably urging said driving rings into frictional engagement with the outer surface of such cylindrical body, means for adjustably positioning said shafts and cylindrical body relatively to each other to vary said desired distance, and means for driving said shafts.

7. In a machine for spirally advancing cylindrical bodies, the combination of a frame, a plurality of angularly and adjustably positioned supporting and guiding rollers, a rotatable shaft carried by said frame, a driving disc having a face inclined to the longitudinal axis of said cylindrical body mounted on said shaft, means for yieldably urging said driving disc into frictional contact with the outer surface of said cylindrical body, and means for driving said shaft.

8. In a machine for helically advancing cylindrical bodies, the combination of means for supporting a cylindrical body, a disc having a face inclined to the outer surface of the cylindrical body, said disc being provided with an annular ring adapted to frictionally engage the surface of said cylindrical body, and means for yieldably urging a portion of the face of said disc into frictional contact with the outer surface of a cylindrical body carried by said supporting means.

9. In a machine for helically advancing cylindrical bodies, the combination of means for rotatably supporting a cylindrical body, a disc having a face inclined to the outer surface of the cylindrical body, said disc face being provided with an annular ring adapted to frictionally engage the surface of said cylindrical body, said disc being mounted on a rotatable shaft whose axis, when extended, will pass the longitudinal axis at a desired distance therefrom, means for adjustably positioning said shaft and cylindrical body relative to each other to vary said desired distance, and means for yieldably urging said disc shaft toward said body to permit said annular ring to frictionally engage the surface of said cylindrical body.

10. In a machine for simultaneously and longitudinally advancing pipe, the combination of a plurality of rollers adapted to guidingly support the pipe, and a circular driving ring lying in a plane inclined to but at less than 90 degrees to a plane passing through the longitudinal axis of the pipe, a portion of said ring face being in frictional contact with the outer surface of said pipe, said ring being mounted on a rotatable shaft whose axis when extended will pass the longitudinal axis of the pipe at a predetermined desired distance therefrom.

11. In a machine for simultaneously rotating and longitudinally advancing cylindrical bodies, the combination of means upon which cylindrical bodies may be supported, and a circular driving disc mounted on a rotatable shaft, said circular driving disc being provided with a face lying in a plane perpendicular to the axis of said shaft, a portion of said face being in frictional contact with the outer surface of said body while on said supporting means.

12. In a machine for spirally advancing cylindrical bodies, the combination of a frame, means upon which cylindrical bodies may be supported carried by said frame, said means including a plurality of rollers, means for adjustably positioning said rollers, a shaft carried by said frame, a driving disc mounted on said shaft, said driving disc being provided with a face lying in a plane perpendicular to the axis of said shaft, a portion of said face being in frictional contact with the outer surface of said body while on said supporting means, and means for driving said shaft.

13. In a machine for spirally advancing pipe, the combination of means upon which pipe may be supported, a circular driving disc mounted on a rotatable shaft whose axis when extended will pass the longitudinal axis of the cylindrical body at a predetermined distance therefrom, said circular driving disc being provided with a face lying in a plane perpendicular to the axis of said shaft, said driving disc being slightly inclined to the outer surface of the pipe, a portion of said face being in frictional contact with the outer surface of said pipe while on said supporting means.

Signed at Los Angeles, Calif. this 7th day of January, 1930.

ROGER C. BOUGHTON.